(12) United States Patent
Fahlgren et al.

(10) Patent No.: US 7,966,046 B2
(45) Date of Patent: Jun. 21, 2011

(54) MOBILE COMMUNICATION AND/OR GAMING TERMINAL

(75) Inventors: Anton Fahlgren, Copenhagen (DK); Chee Wong, Oulu (FI); Kimmo Isbjornssund, Helsinki (FI); Pekka Pihlaja, Helsinki (FI)

(73) Assignee: Nokia Corporation, Espoo (FI)

( * ) Notice: Subject to any disclaimer, the term of this patent is extended or adjusted under 35 U.S.C. 154(b) by 465 days.

(21) Appl. No.: 11/670,723

(22) PCT Filed: Aug. 3, 2004

(86) PCT No.: PCT/EP2004/008687
§ 371 (c)(1),
(2), (4) Date: Dec. 2, 2008

(87) PCT Pub. No.: WO2006/012910
PCT Pub. Date: Feb. 9, 2006

(65) Prior Publication Data
US 2009/0215495 A1   Aug. 27, 2009

(51) Int. Cl.
*H04M 1/00* (2006.01)
*H04M 9/00* (2006.01)
*H04B 1/38* (2006.01)
(52) U.S. Cl. .............. 455/575.1; 455/575.3; 455/575.4; 455/90.3; 379/428.01; 379/433.13
(58) Field of Classification Search .............. 455/575.1, 455/575.3, 575.4, 90.1, 90.2, 90.3; 379/330, 379/428.01, 433.13
See application file for complete search history.

(56) References Cited

U.S. PATENT DOCUMENTS

| | | | | |
|---|---|---|---|---|
| 6,952,601 B2 * | 10/2005 | Lieu et al. | ............... | 455/575.1 |
| 7,035,089 B2 * | 4/2006 | Chuang | ............... | 361/679.2 |
| 7,130,669 B2 * | 10/2006 | Moon | ............... | 455/575.3 |
| 7,138,962 B2 * | 11/2006 | Koenig | ............... | 345/1.3 |
| 7,366,550 B2 * | 4/2008 | Wang et al. | ............... | 455/575.1 |
| 7,616,974 B2 * | 11/2009 | Jaakkola | ............... | 455/575.3 |
| 2002/0132640 A1 | 9/2002 | Hyun et al. | | |
| 2003/0156381 A1 | 8/2003 | Lieu et al. | | |
| 2003/0202656 A1 | 10/2003 | Ikeuchi et al. | | |
| 2004/0048632 A1 * | 3/2004 | Kuroda | ............... | 455/550.1 |
| 2004/0077386 A1 | 4/2004 | Nagasawa | | |
| 2004/0132482 A1 * | 7/2004 | Kang et al. | ............... | 455/550.1 |

FOREIGN PATENT DOCUMENTS

| | | |
|---|---|---|
| CN | 1461135 A | 12/2003 |
| EP | 1385319 | 1/2004 |
| EP | 1426085 | 6/2004 |
| GB | 2372665 | 5/2002 |
| WO | 0199481 | 12/2001 |
| WO | 2004019596 | 4/2004 |

OTHER PUBLICATIONS

Chinese Office Action dated Nov. 27, 2009.

* cited by examiner

*Primary Examiner* — Un C Cho
(74) *Attorney, Agent, or Firm* — Perman & Green, LLP

(57) ABSTRACT

The invention relates to mobile communication and gaming terminals with a housing that is provided with a pair of pivoting wings that allow the terminals to be used in different configurations of the wings relative to the housing.

20 Claims, 4 Drawing Sheets

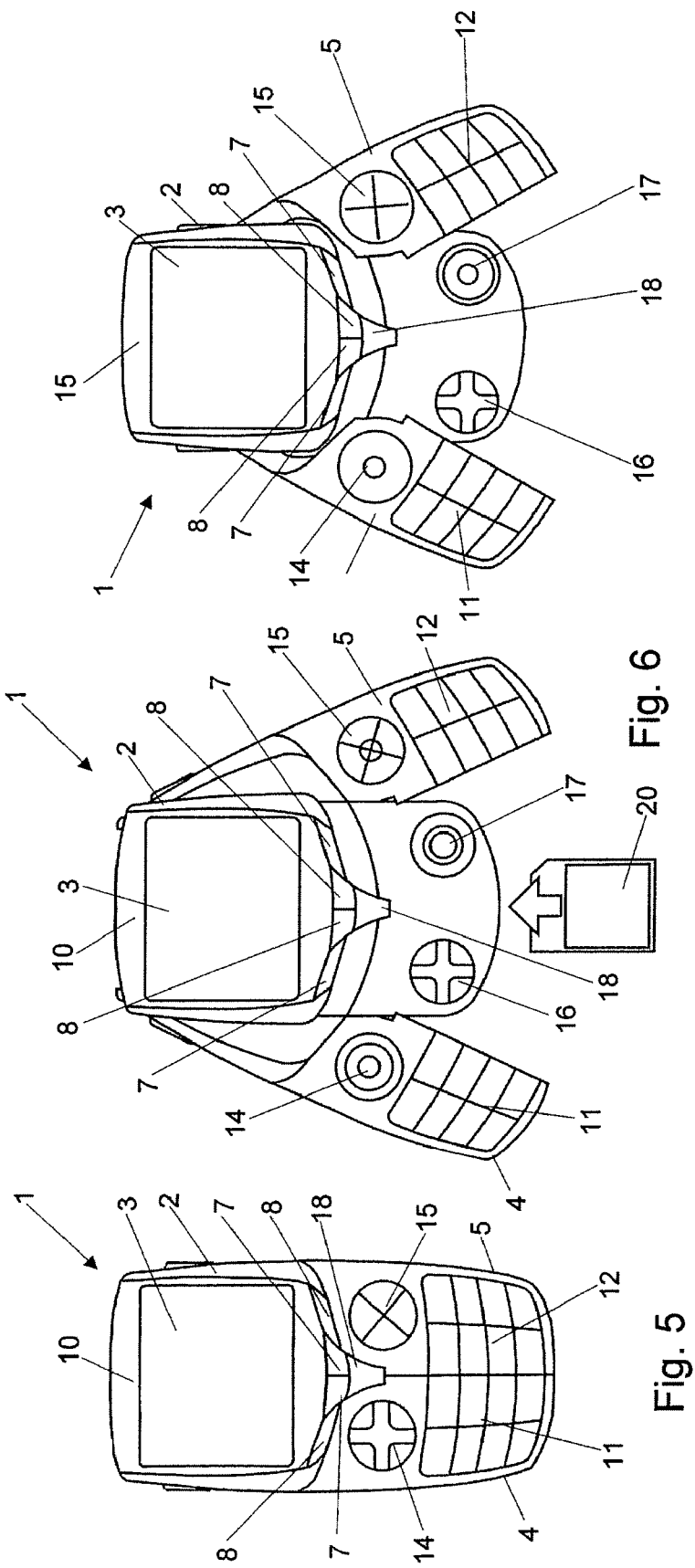
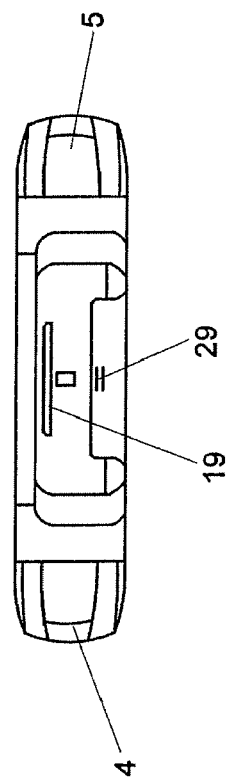
Fig. 5
Fig. 6
Fig. 7
Fig. 8

MOBILE COMMUNICATION AND/OR GAMING TERMINAL

This application is the National Stage of International Application No. PCT/EP2004/008687, International Filing Date, 3 Aug. 2004, which designated the United States of America, and which international application was published under PCT Article 21 (2) as WO Publication No. WO 2006/012910 A1.

The present invention relates to mobile communication terminals and mobile gaming terminals, and in particular to mobile terminals that are provided with movable parts attached to the housing.

BACKGROUND ART

Mobile communication terminals have in the recent past undergone a tremendous increase in the range of features offered by the individual models. The myriad of functions had however not been followed up with an increase in functionality of the mechanical construction of the terminals.

The increasing use of mobile terminals as e-mail or messaging devices has lead to a need to improve the text entry capacity in mobile terminals. Text entry on a standard ITU-T keypad has e.g. been improved by the use of predictive editor programs. Full "QWERTY" type keyboards (or language corresponding versions thereof) have been realized by dividing the keyboards in two halves and disposing the halves on opposite sides of the display, as disclosed by the Nokia 5110® and 6800® models (the latter using a folding mechanism to reduce the size of the terminal). These so-called "split" QWERTY keyboards with a display disposed between the keyboard halves require large eye movements and are therefore not optimal in use. Attachable "click on" or wireless Bluetooth keyboards are also known. These keyboards have the disadvantage that they need to be carried along separately and increase the overall weight and volume of the articles to be transported—and deviate from the desired goal of a compact and truly mobile communication terminal. A folding phone with a large display on one housing half and a full QWERTY keyboard on the other half is known from the Nokia Communicator®. In the open position the phone is generally used as a desktop or laptop i.e. the phone is placed on a substrate when text is to be typed using the QWERTY keyboard. This phone requires a separate interface (placed on the outside of the phone when folded together)—including secondary display—for one hand use. Further, the overall size limitations of the mobile phone limit the maximum size of the QWERTY keyboard, and thus, a compromise between phone size and keyboard size needs to be made which often leads to bulky terminals.

Therefore, none of the above described prior art devices provides optimum combination of compactness and ergonomically arranged keys, navigation pads and joysticks while maximizing the functions and features of mobile communication and gaming terminal.

Mobile communication terminals are increasingly being used as mobile gaming terminals. The layout of a standard mobile terminal with a 3 by 4 alphanumerical keypad, a few softkeys and a four-way navigation pad is however not ideal for playing games. Mobile telephones are in use typically held in one hand and operated with the thumb of the same hand. Mobile gaming terminals are typically held with two hands, and the layout of the controls allows both thumbs plus possibly both index fingers to be used simultaneously, e.g. the thumbs operate each one joystick (or multi-directional pad), and the index fingers operate each one key or button.

The Nokia N-Gage® provides game and phone functionality and includes advanced gaming and phone functionality. A disadvantage of the Nokia N-Gage® is, however, that the display size is limited and gaming keys, especially action keys on the right side of the display, need to be integrated in the standard ITU-T keypad.

There is thus, a need for a mobile terminal which provides on the one hand a user interface for gaming, including e.g. joysticks, a large display and other functionalities for gaming and, on the other hand, supports phone functionalities which usually require an ITU-T key pad at least.

DISCLOSURE OF THE INVENTION

The invention described below provides a communication terminal comprising a housing provided with a display that forms part of a user interface, two wings pivotably suspended from the housing, the wings being configured to swing in opposite directions in a plane that is substantially parallel to the plane of the display between a retracted position, in which a substantial part of the wings is overlapped by the housing, and an extended position, in which a substantial part of the wings is not overlapped by the housing. Furthermore, the sides of the wings in the extended position are meeting one another.

The invention described below also provides a mobile communication terminal comprising a housing provided with a display that forms part of a user interface, a keypad adjacent the display, two wings pivotably suspended from the housing in opposite directions in a plane that is substantially parallel to the plane of said display between a retracted position and an extended position, one part of the keypad being disposed on one of the wings, and another part of the keypad being disposed on the other wing, the two parts of the keypad forming one substantially continuous keypad in the retracted position, the wings in the extended position transforming the mobile terminal from a one hand held communication terminal into a two hands held game controller.

The invention described below further provides a mobile communication and/or gaming terminal comprising a display in a display housing, two wings pivotably suspended from the display housing in opposite directions in a plane that is substantially parallel to the plane of the display between a retracted position and an extended position, a majority of the electronic components of the terminal being disposed inside the two pivotable wings, and the wings in the extended position forming handles that allow the terminal to be used as a game controller.

BRIEF DESCRIPTION OF THE DRAWINGS

In the following detailed portion of the present description, the invention will be explained in more detail with reference to the exemplary embodiments shown in the drawings, in which

FIG. 5 is a front view of a mobile terminal according to a second embodiment with the wings in the retracted position;

FIG. 6 is a front view of the terminal of FIG. 5 with the wings in the extended position;

FIG. 7 is a view on the bottom of the mobile terminal of FIG. 5 with the wings in the closed position;

FIG. 8 is a front view of a variation of the terminal of FIG. 5 with the wings in the extended position;

DETAILED DESCRIPTION

Figure 1:
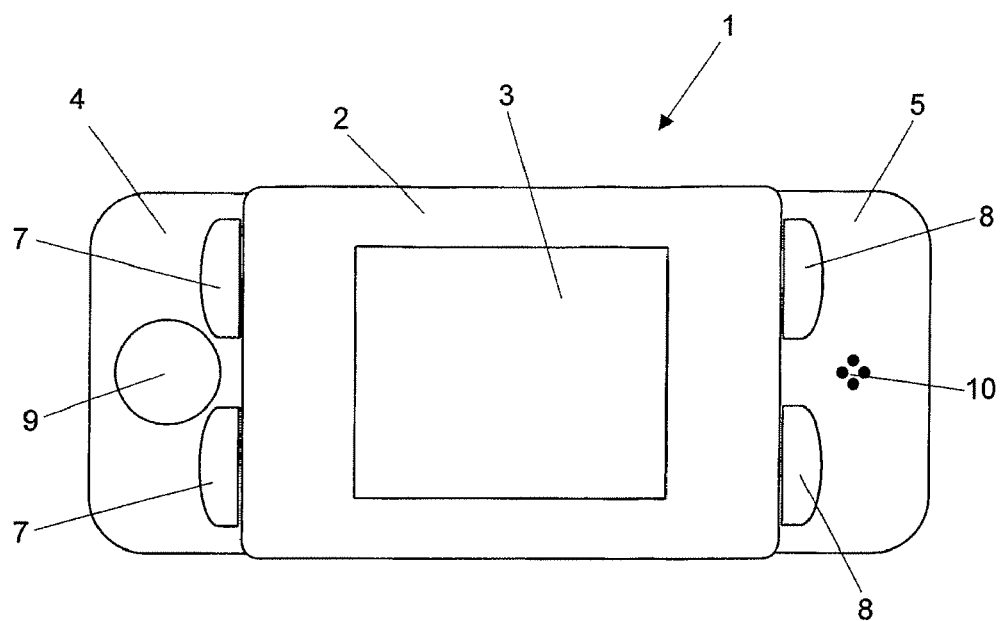
FIG. 1 is a front view of a mobile terminal according to a first embodiment with its wings in the retracted position.
Figure 2:
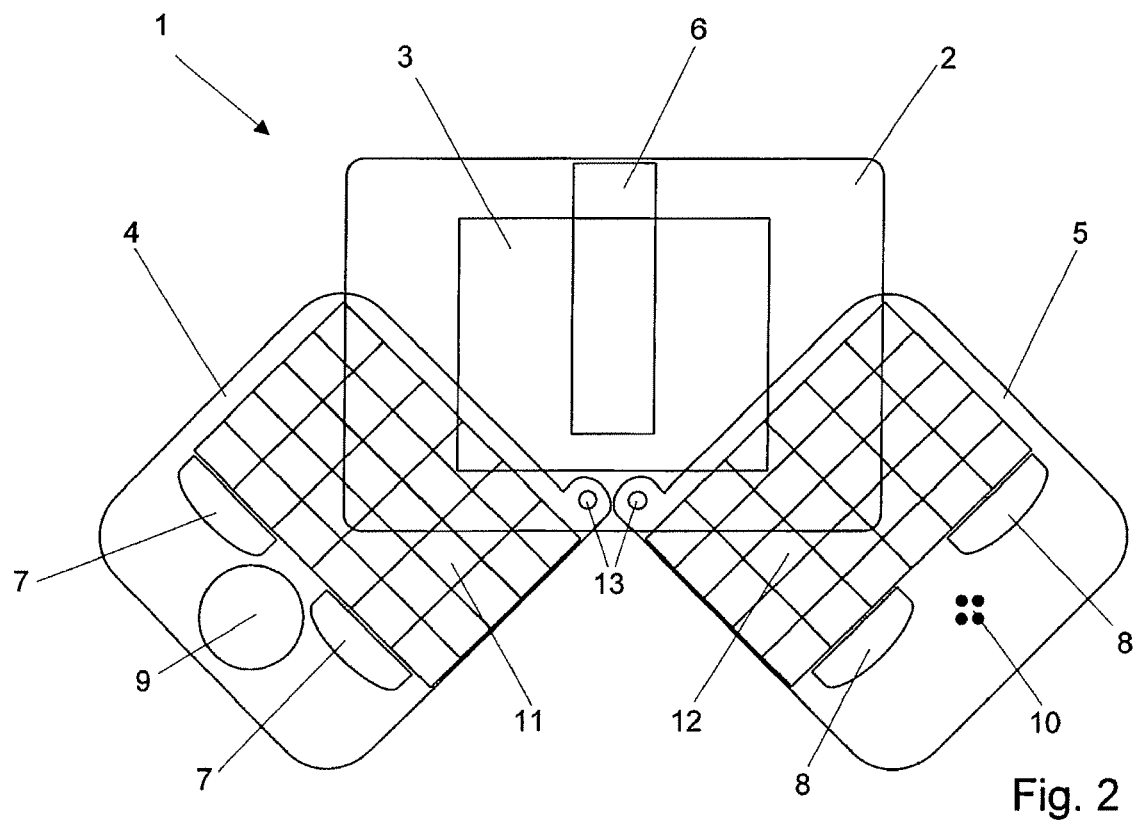
FIG. 2 is a semi-transparent front view of the mobile terminal of FIG. 1 with the wings in an intermediate position.
Figure 3:
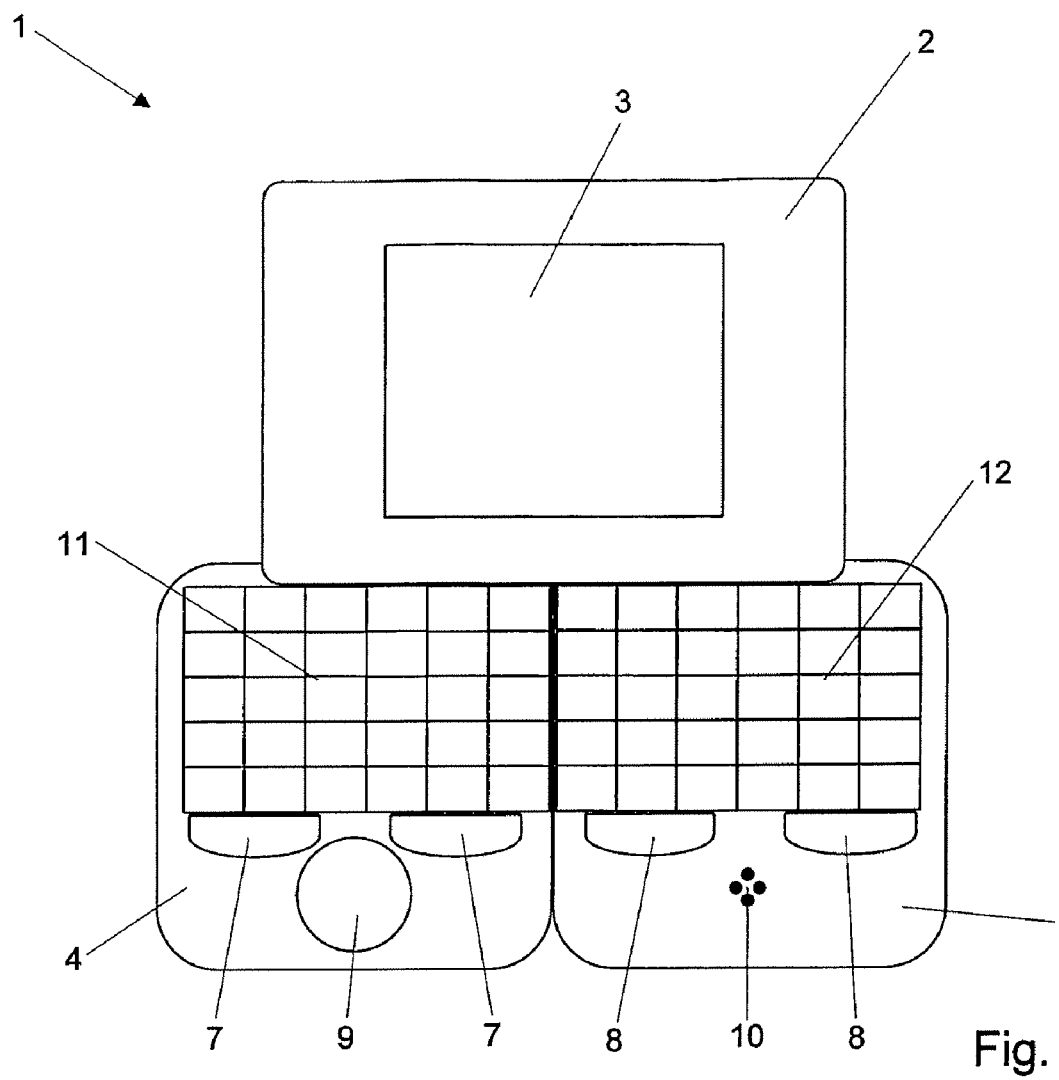
FIG. 3 is a front view of the terminal of FIG. 1 with the wings in the extended position.

Referring to FIGS. 1, 2 (semi-transparent view) and 3, a mobile phone 1 according to a first preferred embodiment includes a housing 2 provided with a display 3 and two pivotally attached wings 4 and 5. In the preferred embodiments the display is a liquid crystal display (LCD). However, the display can be any type of display and the teachings or the scope of the claims as set forth herein is not limited thereby. The wings 4,5 can pivot in a plane that is substantially parallel to the plane of the display, from a retracted position shown in FIG. 1 via an intermediate position shown in FIG. 2 to an extended position shown in FIG. 3 in which the sides of the wings 4,5 abut. The mobile phone 1 according to this preferred embodiment is adapted for communication via a cellular network, such as the GSM 900/1800 MHz network, but could just as well be adapted for use with a Code Division Multiple Access (CDMA) network, a G3 network, or a TCP/IP-based network to cover a possible VoIP-network (e.g. via WLAN, WIMAX or similar).

The mobile phone 1 also comprises all conventional components of this type of terminal such as a microprocessor for controlling the operation of the mobile telephone 1 and a program memory for storing programs used by the mobile telephone. Input/output circuits interface the microprocessor with the keys, the display 3, audio processing circuits, receiver, and transmitter. The audio processing circuits provide basic analog audio outputs to the speaker and accept analog audio inputs from the microphone. A conventional signal combiner permits two-way, fully duplex communication over a common internal antenna. The processor forms the interface to the peripheral units of the apparatus, including a RAM memory and a Flash ROM memory, a SIM card and the keys, multi-way pads and joysticks, as well as data, power supply (rechargeable battery), etc. As these components are well known, they are not further described in detail nor illustrated in the drawings.

Figure 4:
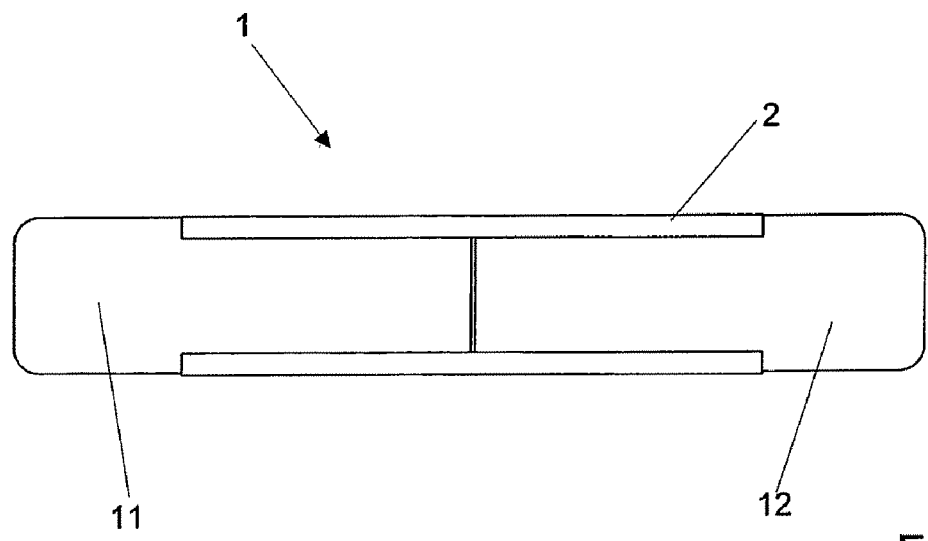
FIG. 4 is a view on the bottom of the mobile terminal of FIG. 1 with the wings in the closed position.

As shown in FIG. 4, a major part of the wings 4,5 is received inside a slot in the housing 2 formed between the front and the rear of the housing 2 when the wings 4,5 are in the retracted position. A bridge 6 (FIG. 2) connects the front to the rear of the housing 2. The wings 4,5 are suspended from the housing 2 by pivot pins 13. The pivot pins 13 extend from the rear to the front of the housing 2 through lobes that extend from the wings 4,5 provided with throughgoing bores.

In the retracted position four keys of the wings 4,5 are still accessible. These four keys comprise two multifunctional softkeys 7 on wing 4 and call handling keys 8 on wing 5. Wing 4 is provided with an opening for a microphone (not shown) and a multi directional pad 9 and wing 5 is provided with an earpiece 10 (only the openings therefore are shown).

Each of the wings is provided with a half 11,12 of a full QWERTY type keyboard (or other language version thereof). These keys are not accessible when the wings 4,5 are in the retracted position. When the wings 4,5 are in the extended position the complementary sides of the wings 4,5 abut and the two halves 11,12 of the QWERTY keyboard form a unitary QWERTY keyboard just below the display 3.

The mobile phone 1 is used in the upright position when the wings 4,5 are in the retracted position, i.e. like a conventional mobile phone. Sensors (not shown) detect the position of the wings 4,5. When the wings 4,5 are moved to the extended position, the orientation of the information shown on the display 3 is automatically rotated 90° so that the terminal can be used in the horizontal position and vice versa.

The wings 4,5 may be geared to one another by a mechanism (not shown) so that their movement is synchronized. The wings 4,5 may contain relatively heavy components of the terminal for optimal weight distribution, such as the engine or the rechargeable battery pack (or packs).

According to a variation (not shown) of the first embodiment, the wings are each provided with a display. The displays form a combined large display when the wings are in the extended position, while the displays are protected in the retracted position.

Referring now to FIGS. 5, 6 and 7, a mobile phone according to a second preferred embodiment includes a housing 2 provided with a display 3 and two pivotally attached wings 4 and 5. The wings 4,5 can pivot in a plane that is substantially parallel to the plane of the display 3 between a retracted position shown in FIG. 5 and an extended position shown in FIG. 6, in which the wings 4,5 project at an acute angle from the housing 2. The wings 4,5 are suspended from the housing 2 by pivot pins (not shown) arranged in the upper part of the housing 2. The angle between the longitudinal axis of the phone 1 and the longitudinal axis of the wings 4,5 in the extended position can range from about 20 to about 40 degrees.

The mobile phone 1 according to the second preferred embodiment is adapted for communication via a cellular network, such as the GSM 900/1800 MHz network, but could just as well be adapted for use with a Code Division Multiple Access (CDMA) network or a G3 network, or a TCP/IP-based network to cover a possible VoIP-network (e.g. via WLAN, WIMAX or similar).

The mobile phone 1 also comprises all conventional components (internal components not shown) of such a terminal, e.g. a microprocessor for controlling the operation of the mobile telephone 1 and a program memory for storing programs used by the mobile telephone. Input/output circuits interface the microprocessor with the keys, the display 3, audio processing circuits, receiver, and transmitter. The audio processing circuits provide basic analog audio outputs to the speaker and accepts analog audio inputs from the microphone. A conventional signal combiner permits two-way fully duplex communication over a common internal antenna. The processor forms the interface to the peripheral units of the apparatus, including a RAM memory and a Flash ROM memory, a SIM card and the keys, multi-way pads and joysticks, as well as data, power supply (rechargeable battery) etc. As these components are well known they are not further described in detail nor illustrated in the drawings.

The wings 4,5 may be geared to one another so that their movement is synchronized. The wings 4,5 may contain relatively heavy components of said terminal for optimal weight distribution, such as the engine or the rechargeable battery pack (or packs).

The phone 1 is provided with a standard 3 by 4 ITU-T keypad that is extended on the left hand side with an additional column of keys to form a 4 by 4 keypad. The added column is e.g. provided with a menu key (if not provided elsewhere), a clear key and a text handling key that allows marking of texts, other configurations of the added column are possible, i.e. the column could be provided with an application key, a cancel key, a shift key, and/or a camera shortcut key. Each of the wings 4,5 is provided with a half 11,12 of the keypad 4 by 4 keypad. The left half 11 includes two columns and includes the added column and the left column of the ITU-T keypad. The right half 12 includes the middle and right column of the ITU-T keypad. Above the keypad half, each of the wings 4,5 is provided with a controller 14,15, such as a multi directional pad, a joystick or a key.

Two multifunctional softkeys 7, a menu key 18 and call handling keys 8 are provided on the housing 2, above the wings 4,5 and below the display 3.

The bottom of the housing 2 (FIG. 7) is provided with a microphone 29 (only the openings are shown) and with a slot 19 for receiving a memory card 20, e.g. a game cartridge. The slot 19 is accessible only when the wings 4,5 are in the extended position. The upper part of the housing 2 is provided with an earpiece 10 (only the openings therefor are shown) in the upper part of the phone 1.

In the retracted position the wings 4,5 cover the lower part of the housing 2. As shown in FIG. 6, the lower part of the housing 2 is accessible when the wings 4,5 are moved to the extended position. The lower part of the housing 2 is provided with two gaming controllers 16,17. The gaming control elements 16,17 are selected from the group comprising joysticks, multi-directional pads, buttons (keys), and touch pads. The lower housing part and/or the wings 4,5, at the front, rear or sides thereof can be provided with further keys that facilitate gameplay.

When the wings 4,5 are in the retracted position the mobile phone 1 has the shape of a one hand held conventional mobile phone, i.e. a rounded relatively flat cuboid. When the wings 4,5 are moved to the extended position the shape of the phone 1 changes to the shape of a conventional game controller with two wings disposed at an actuate angle bridged by a central part (in this case the housing 2). Thus, a user can hold the device with two hands like a game controller while following a game on the display 3.

The mobile phone 1 is used in the upright position both in the retracted and the extended position of the wings 4,5. Sensors (not shown) detect the position of the wings 4,5. When the wings 4,5 are moved to the extended position the operation mode of the phone 1 is automatically changed from a communication mode to a gaming mode and vice versa.

FIG. 8 illustrates a variation of the mobile phone 1 according to a second preferred embodiment. The phone illustrated in FIG. 8 is substantially identical to the mobile phone according to the second embodiment apart from the following changes. The pivot points of the wings 4,5 in the phone 1 shown in FIG. 8 are disposed lower relative to the height of the housing 2 and the angle at which the wings 4,5 extend relative to the longitudinal axis of the housing 2 in the extended position is increased relative to the phone according to the second preferred embodiment.

Figure 9:
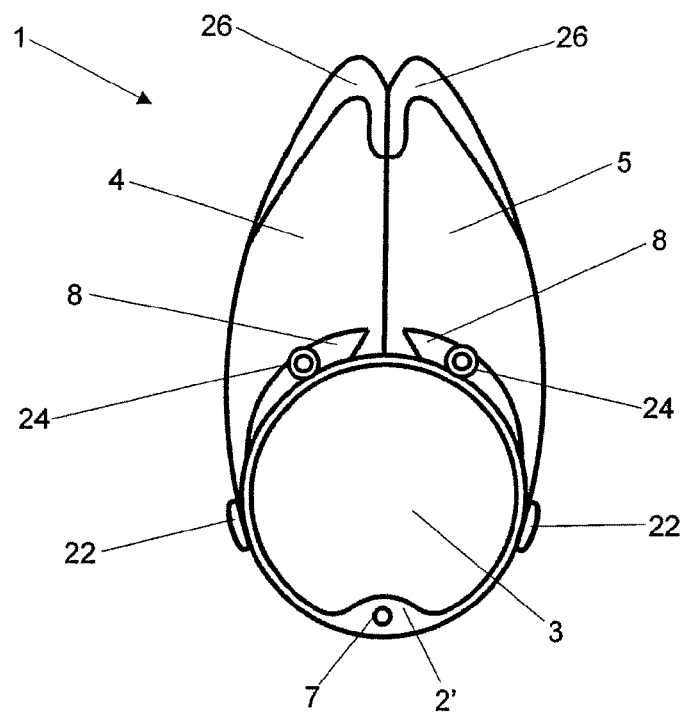
FIG. 9 is a front view of a mobile terminal according to a third embodiment with the wings in the retracted position.
Figure 10:
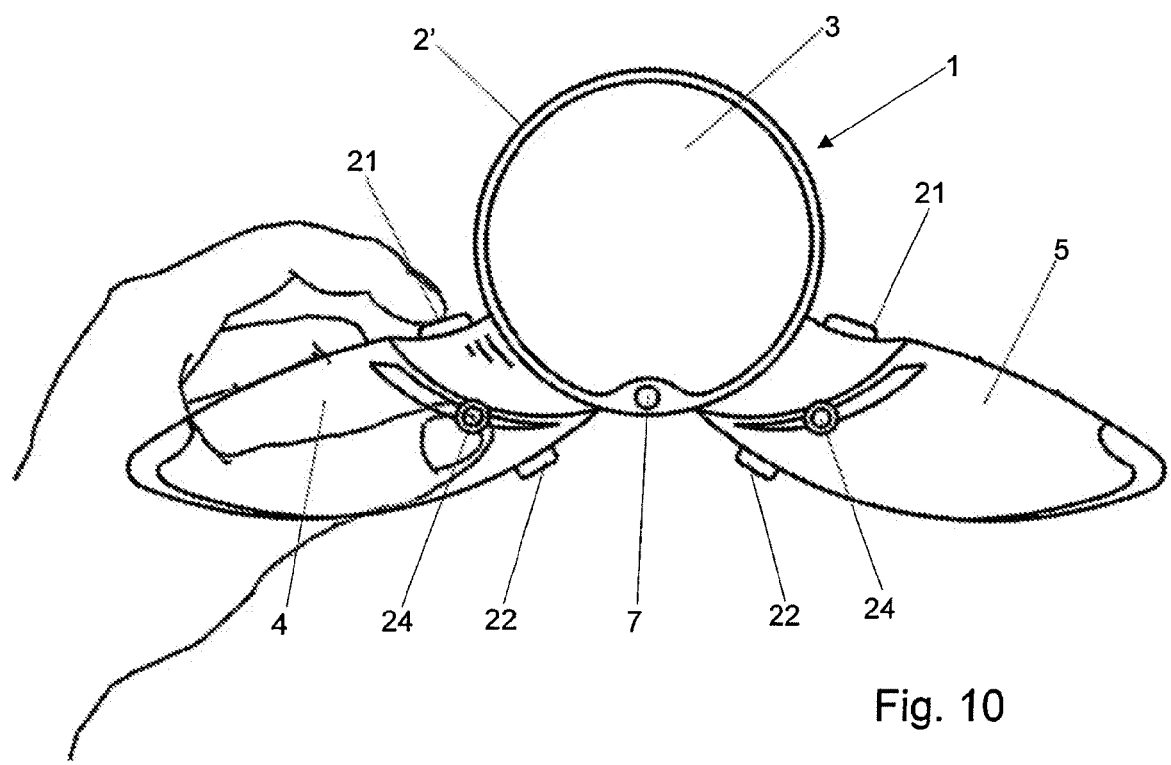
FIG. 10 is a front view of the terminal of FIG. 9 with the wings in the extended position.

Referring now to FIGS. 9 and 10, a mobile phone 1 according to a third preferred embodiment includes a display housing 2' provided with a display 3. Two wings 4 and 5 are pivotably attached to the display housing 2'. The wings 4,5 can pivot in a plane that is substantially parallel to the plane of the display 3 between a retracted position shown in FIG. 9 and an extended position shown in FIG. 10. The wings swing over an obtuse angle from the retracted position in which their preferably complementary sides meet to the extended position and vice versa. The wings 4,5 are suspended from the display housing 2' by pivot pins (not shown) arranged in the lower part of the display housing 2'. The mobile phone 1 according to the third preferred embodiment is adapted for communication via a cellular network, such as the GSM 900/1800 MHz network, but could just as well be adapted for use with a Code Division Multiple Access (CDMA) network or a G3 network, or a TCP/IP-based network to cover a possible VoIP-network (e.g. via WLAN, WIMAX or similar).

The mobile phone 1 also comprises all conventional components (internal components not shown) of this type of terminal such as microprocessor for controlling the operation of the mobile telephone 1 and a program memory for storing programs used by the mobile telephone. Input/output circuits interface the microprocessor with the keys, the display 3, audio processing circuits, receiver, and transmitter. The audio processing circuits provide basic analog audio outputs to the speaker and accept analog audio inputs from the microphone. A conventional signal combiner permits two-way, fully duplex communication over a common internal antenna. The processor forms the interface to the peripheral units of the apparatus, including a RAM memory and a Flash ROM memory, a SIM card and the keys, multi-way pads and joysticks, as well as data, power supply (rechargeable battery), etc. As these components are well known they are not further described in detail nor illustrated in the drawings. Most of these components of the mobile phone are disposed in the wings 4,5, whereas the display housing 2' includes the minimum amount of electronic components, i.e. apart from the display itself and some contacts, sensors, wiring and a PCB, all electronic components are disposed in the wings 4,5.

Protector pads 26 are disposed on the free ends of the wings 4,5. The protector pads 26 are either made from a hard and strong material such as steel or carbon, or from a resilient shock absorbing material such as rubber. Alternatively, the pads can be made as a composite material with a hard and strong inner layer and a soft and resilient outer layer.

The wings 4,5 can at least partially be made of a transparent material, allowing the interior of the wings to bee seen, and the wings may include cells filled with a liquid that moves when the mobile phone 1 is moved.

The wings 4,5 may be geared to one another by a mechanism (not shown) so that their movement is synchronized.

The mobile phone 1 in the shown embodiment is not provided with a standard 3 by 4 ITU-T keypad, but it is feasible to include a—preferably split—keypad similar to the keypad of the second preferred embodiment. The display housing 2' is provided with a central softkey 7 below the display that gives e.g. access to the menu. The wings 4,5 include call handling keys 8, mini-joysticks 24, and keys (buttons) 21 and 22. A majority of the control elements, i.e. keys, directional pads and/or joysticks are disposed on the wings.

In the retracted position the keys 22 or one of them can be used as a "clear" key, the mini joysticks 24 can be used for navigation in menus, in texts, or in calendars, etc. In the extended position, the mini-joysticks 24 and the keys 21 and 22 can be used for gaming functions.

When the wings 4,5 are in the retracted position, the mobile phone 1 has the shape of a one hand held single body mobile phone, i.e. a rounded relatively flat cuboid or, as shown, a variation thereof. When the wings 4,5 are moved to the extended position, the shape of the phone 1 changes to the shape of a conventional game controller with two wings disposed at an actuate/acute? angle bridged by a central part (in this case the housing 2). Thus, a user can hold the device with two hands like a game controller while following a game on the display 3.

The mobile phone 1 is used in the upright position both in the retracted and extended position of the wings 4,5. Sensors (not shown) detect the position of the wings 4,5. When the wings 4,5 are moved to the extended position, the operation mode of the mobile phone 1 is automatically changed from a communication mode to a gaming mode and vice versa. According to a variation of the third embodiment, the mobile phone 1 is used "upside down" when the wings are in the retracted position with the protective pads 26 pointing downwards and the orientation of the information on the display adjusted accordingly.

Although the present invention has been described in detail for purpose of illustration, it is understood that such detail is solely for that purpose, and variations can be made therein by those skilled in the art without departing from the scope of the invention.

The invention claimed is:

1. A mobile communication terminal comprising:

a housing provided with a display that forms part of a user interface;

two wings provided with keys and pivotably suspended from said housing;

said wings being configured to swing in opposite directions in a plane that is substantially parallel to the plane of said display between a retracted position in which a substantial part of said wings is overlapped by said housing and a part of said wings is not overlapped by said housing and an extended position in which a substantial part of said wings is not overlapped by said housing; and the sides of said wings are configured to, meet one another in the extended position, wherein one or more of said keys are covered by the housing in the retracted position and one or more keys are accessible in the retracted position, wherein the one or more keys accessible in the retracted position are located on the same surface as the one or more keys covered by the housing in the retracted position.

2. The mobile communication terminal according to claim 1, wherein the sides of the wings that meet one another in the extended position are complementary so that the two wings form one unit in the extended position.

3. The mobile communication terminal according to claim 2, wherein said wings are provided with displays, and said displays form a combined large display when the wings are in the extended position.

4. The mobile communication terminal according to claim 1, wherein said wings are provided with elements of the user interface.

5. The mobile communication terminal according to claim 1, wherein the keys of the two wings in the extended position form together a keypad or keyboard, preferably a "QWERTY" type keypad.

6. The mobile communication terminal according to claim 1, wherein the orientation of information shown on the display is changed in response to a movement of said wings between the retracted and extended positions to allow the terminal to be used in a first orientation with the wings in the retracted position and in a second orientation with the wings in the extended position, said first and second orientation preferably differing from one another by 90.degree.

7. The mobile communication terminal according to claim 1, wherein said wings are geared to one another so that their movement is synchronized.

8. The mobile communication terminal according to claim 1, wherein said wings contain relatively heavy components of said terminal for optimal weight distribution.

9. A mobile communication terminal comprising:

a housing provided with a display that forms part of a user interface;

a keypad adjacent said display;

two wings pivotably suspended from said housing in opposite directions in a plane that is substantially parallel to the plane of said display between a retracted position and an extended position;

one part of said keypad being disposed on one of said wings, and another part of said keypad being disposed on the other wing;

said two parts of said keypad being accessible in the retracted position, wherein substantially all of said keypad is exposed;

said two parts of said keypad forming one substantially continuous keypad in the retracted position; and said wings in the extended position transforming the mobile terminal from a one hand held communication terminal into a two hands held game controller.

10. The mobile communication terminal according to claim 9, wherein said wings in the retracted position overlap a part of the housing provided with further elements of said user interface, and said further elements being accessible when said wings are in the extended position.

11. The mobile communication terminal according to claim 10, wherein said further elements of the user interface are game control elements, said elements preferably being selected from the group comprising joysticks, directional pads, touch pads, and keys.

12. The mobile communication terminal according to claim 9, wherein the terminal changes from a communication mode of operation into a gaming mode of operation when the wings are moved from the retracted position to the extended position and vice versa.

13. The mobile communication terminal according to claim 9, wherein a slot in said housing is accessible when the wings are in the extended position and accessible when said wings are in the retracted position.

14. The mobile communication terminal according to claim 9, wherein the angle between the retracted position and the extended position of a wing is acute.

15. A mobile communication and/or gaming terminal comprising:

a display in a display housing;

two wings pivotably suspended from said display housing in opposite directions in a plane that is substantially parallel to the plane of said display between a retracted position and an extended position;

a majority of the electronic components of the terminal being disposed inside the two pivotable wings; and said wings are configured to form handles in the extended position, wherein said handles allow the terminal to be used as a game controller.

16. The mobile communication terminal according to claim 15, further being provided with keys or directional pads or joysticks, wherein a major part of said keys, directional pads and/or joysticks is disposed on said wings.

17. The mobile communication terminal according to claim 15, wherein said wings and said display housing form a single body when said wings are in the retracted position.

18. The mobile communication terminal according to claim 15, wherein the free extremities of said wings are provided with protective corners of either a relatively strong and hard material such as steel or carbon or a relatively soft resilient material such as rubber.

19. The mobile communication terminal according to claim 15, wherein said wings are at least partially transparent and contain liquid filled cells in which the liquid moves when the terminal is moved.

20. The mobile communication terminal according to claim 15, wherein the angle between the retracted position and the extended position of a wing is obtuse.

* * * * *